US008160468B2

(12) United States Patent
Okamura

(10) Patent No.: US 8,160,468 B2
(45) Date of Patent: Apr. 17, 2012

(54) IMAGE FORMING APPARATUS, MEMORY MANAGEMENT METHOD, MEMORY MANAGEMENT PROGRAM PRODUCT

(75) Inventor: Takao Okamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 476 days.

(21) Appl. No.: 12/505,647

(22) Filed: Jul. 20, 2009

(65) Prior Publication Data

US 2010/0034551 A1 Feb. 11, 2010

(30) Foreign Application Priority Data

Aug. 5, 2008 (JP) ................................ 2008-202156

(51) Int. Cl.
*G03G 15/00* (2006.01)
*G06K 15/00* (2006.01)

(52) U.S. Cl. ........................................ 399/75; 358/1.16

(58) Field of Classification Search .................... 399/75, 399/76, 77, 83, 411; 358/1.16
See application file for complete search history.

(56) References Cited

U.S. PATENT DOCUMENTS 5,987,230 A * 11/1999 Shimizu ....................... 358/1.16
6,219,152 B1 * 4/2001 Someya et al. .............. 358/1.16
6,708,234 B2 3/2004 Moteki et al.
6,980,702 B2 12/2005 Michiie et al.
7,034,838 B2 4/2006 Obata et al.
7,142,730 B2 11/2006 Michiie et al.
7,185,151 B2 2/2007 Michiie et al.
7,259,876 B2 8/2007 Obata et al.
7,515,293 B2 4/2009 Kizaki et al.
2004/0109186 A1 6/2004 Shindoh et al.
2004/0114171 A1 6/2004 Shindoh et al.
2004/0136022 A1 7/2004 Kizaki et al.
2007/0121161 A1 * 5/2007 Yamada ....................... 358/1.16

FOREIGN PATENT DOCUMENTS

JP 2000-138809 5/2000
JP 2001-053941 2/2001
JP 2001-080136 3/2001
JP 2001-265650 9/2001
JP 2002-300385 10/2002
JP 2006-001195 1/2006
JP 2006-320021 11/2006
JP 2007-116458 5/2007

* cited by examiner

*Primary Examiner* — Sandra Brase
(74) *Attorney, Agent, or Firm* — IPUSA, PLLC

(57) ABSTRACT

An image forming apparatus includes a storage area used as a work area of programs for implementing functions, the programs including a basic function program configured to implement a basic function and an extension function program configured to implement an extension function, wherein the entire storage area is used in the event that the basic function program is executed to implement a specified maximum function of the basic function; a detecting unit configured to detect a usage state of the storage area; a storage unit configured to store information indicating an allocation mode defining a method of allocating the work area to the programs; and an allocation unit configured to allocate the work area to each of the programs that is to be executed, according to the usage state of the storage area detected by the detecting unit and the allocation mode stored in the storage unit.

8 Claims, 19 Drawing Sheets

IMAGE FORMING APPARATUS, MEMORY MANAGEMENT METHOD, MEMORY MANAGEMENT PROGRAM PRODUCT

BACKGROUND OF THE INVENTION

1. Field of the Invention

The present invention relates to the field of image forming apparatuses, memory management methods, and memory management program products.

2. Description of the Related Art

Technologies related to multifunction peripherals (MFP) are developing, such as increasingly high-performance Central Processing Units (CPU), larger memories, increasingly high-speed communication technologies, and more sophisticated imaging technologies. With the development of these technologies, in addition to a digital copier having a single function, there is provided a digital MFP having multiple functions such as those of a fax machine, a printer, and a scanner. Such a digital MFP is used in various scenes of the user's environment. This kind of MFP (high-end model copier) is provided with various applications for performing multiple functions. FIG. 16 schematically illustrates a standard memory area provided in a high-end model copier, and memory areas allocated to the installed applications. This schematic diagram indicates that the standard memory in a high-end model copier has a memory area (for example, a RAM area) that is large enough to be allocated to multiple applications.

A product that is positioned opposite from the high-end model copier is a low-end model copier (low-cost copier), which is used in small-scale offices (SOHO) (for example, patent document 1). FIG. 17 schematically illustrates a standard memory area provided in a low-end model copier, and the memory area allocated to the installed application. This kind of copier is only provided with a single function such as a copier function to limit the size of the installed memory, thereby reducing cost. Meanwhile, there is a strong demand for a low-end model copier having multiple functions. Such a demand can be accommodated by optionally adding functions (extension functions) to implement multiple functions. FIG. 18 schematically illustrates optional memories added to a low-end model copier. FIG. 19 schematically illustrates optional memories added to the low-end model copier, and memory areas allocated to the applications corresponding to the optional memory areas.

Patent Document 1: Japanese Laid-Open Patent Application No. 2006-001195

However, the low-end model copier described in patent document 1 is designed, in line with its concept, to have a pre-installed standard memory capacity that is much smaller than that of a high-end model copier. For example, a copier that only has a copy function does not include a high-capacity storage such as a HDD; the installed memory only has the minimum storage area (work area) required for performing a copying process. A low-end model copier cannot be provided with a high-capacity memory due to cost restraints, and therefore only a low-capacity memory is provided. Typically, a low-end model copier only has a single function (for example, only a copy function). Accordingly, when the low-end model copier is activated, a memory area is allocated to the corresponding application in a static/fixed manner (memory mapping), and no subsequent changes are made (no subsequent changes are necessary).

Thus, in order to add an extension function to a low-end model copier, it is necessary to purchase an application program for implementing the extension function, and also an expensive physical memory for executing the application program. As a result of installing such an optional function, the user cannot enjoy the benefit of low cost, which is supposed to be the sales point of a low-end model copier.

Specifically, the user needs to purchase an optional component which is a combination of an extension function application program (ROM) and a memory (RAM) used as the work area of the program. As described above, a low-end model copier can be provided at low cost when it only includes the standard function (single application). However, when plural applications are installed, the user cannot enjoy the benefit of low cost.

SUMMARY OF THE INVENTION

The present invention provides an image forming apparatus, a memory management method, and a memory management program product in which one or more of the above-described disadvantages are eliminated.

A preferred embodiment of the present invention provides an image forming apparatus, a memory management method, and a memory management program product, with which a low-capacity memory can be efficiently used to operate plural applications.

According to an aspect of the present invention, there is provided an image forming apparatus including a storage area used as a work area of programs for implementing functions, the programs including a basic function program configured to implement a basic function and an extension function program configured to implement an extension function, wherein the entire storage area is used in the event that the basic function program is executed to implement a specified maximum function of the basic function; a usage state detecting unit configured to detect a usage state of the storage area; an allocation mode storage unit configured to store information indicating an allocation mode defining a method of allocating the work area to the programs; and a work area allocation unit configured to allocate the work area to each of the programs that is to be executed, according to the usage state of the storage area detected by the usage state detecting unit and the allocation mode stored in the allocation mode storage unit.

According to an aspect of the present invention, there is provided a memory management method performed by an image forming apparatus including a storage area used as a work area of programs for implementing functions, the programs including a basic function program configured to implement a basic function and an extension function program configured to implement an extension function, wherein the entire storage area is used in the event that the basic function program is executed to implement a specified maximum function of the basic function, wherein the memory management method includes a usage state detecting step of detecting a usage state of the storage area; an allocation mode storage step of storing information indicating an allocation mode defining a method of allocating the work area to the programs; and a work area allocation step of allocating the work area to each of the programs that is to be executed, according to the usage state of the storage area detected at the usage state detecting step and the allocation mode stored at the allocation mode storage step.

According to one embodiment of the present invention, an image forming apparatus, a memory management method, and a memory management program product are provided, with which a low-capacity memory can be efficiently used to operate plural applications.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

(Image Forming Apparatus)

Figure 1:
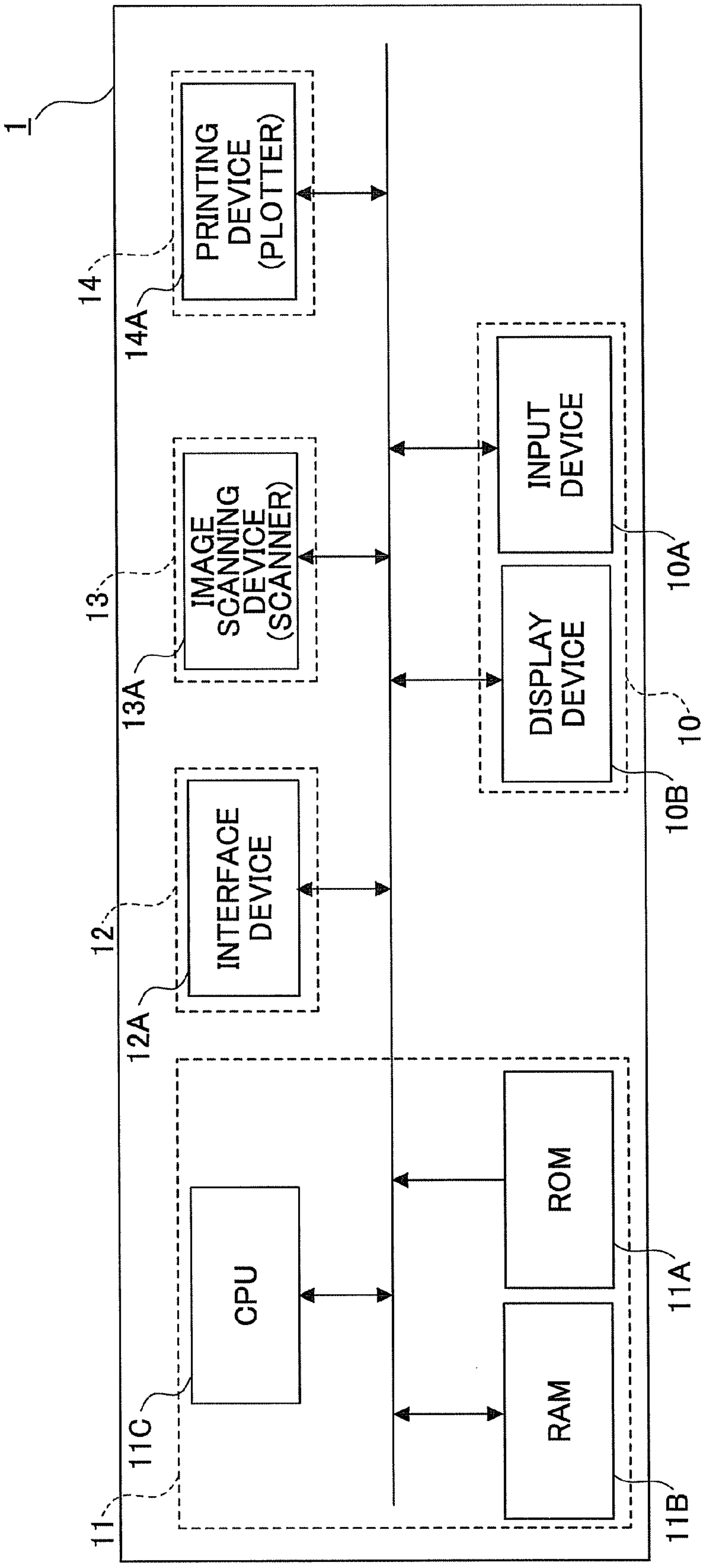
FIG. 1 illustrates the main hardware configuration of an image forming apparatus according to an embodiment of the present invention.

FIG. 1 illustrates the main hardware configuration of an image forming apparatus 1 according to an embodiment of the present invention. The main hardware elements included in the image forming apparatus 1 are an operations panel 10, a controller 11, a data communications interface (I/F) 12, a scanner 13, and a plotter 14, which are interconnected to each other.

The operations panel 10 includes an input device 10A and a display device 10B. The input device 10A may be constituted by hardware keys used for inputting various operation signals to the image forming apparatus 1. The display device 10B displays, for example, various information items pertaining to the image forming process. The data communications I/F 12 includes an interface device 12A functioning as an interface for connecting the image forming apparatus 1 to a data transmission path such as a network.

The controller 11 includes a ROM (Read Only Memory) 11A, a RAM (Random Access Memory) 11B, and a CPU (Central Processing Unit) 11C. The ROM 11A is a non-volatile memory that stores programs that are executed when the image forming apparatus 1 is activated, programs for implementing the basic function of the image forming apparatus 1, programs according to an embodiment of the present invention, and various kinds of data including information for indicating an allocation mode (for examples a flag). The image forming apparatus 1 has an expansion slot (not shown) provided on the motherboard so that the ROM can be expanded. One or more ROMs 11A can be added to the expansion slot. The expanded part of the ROM 11A stores a program for implementing the expansion function in the image forming apparatus 1. That is, the program for implementing the expansion function is additionally stored in the ROM 11A.

The RAM 11B temporarily holds a management area for managing various programs read from the ROM 11A, image data obtained by a scanning processor and the usage state of the storage area. Furthermore, the CPU 11C executes the programs temporarily being held by the RAM 11B. For example, when print data is received via the data communications I/F 12, the controller 11 reads a program (PDL parser) capable of interpreting PDL (Page Description Language), which has been read from the ROM 11A and loaded in the RAM 11B. Then, the controller 11 causes the CPU 11C to execute the program, so that the print data is interpreted and a bitmap image is generated.

The scanner 13 includes an image scanning device 13A for optically reading an original placed on a scanning surface, to generate image data. The plotter 14 includes a printing device 14A for printing, for example, a bitmap image onto a recording sheet by an electrophotographic process.

With the above-described hardware configuration, the image forming apparatus 1 according to the present embodiment implements a copy function (including scanning and printing) that is the basic function, and a fax function and a security function that are extension functions.

In FIG. 1, the ROM 11A and the RAM 11B are each logically illustrated as a single unit, but may be physically divided into plural units. For example, a RAM 11D (not shown) may be provided as an area for loading a program executed by the CPU 11C, and the RAM 11B may be used as the work area (an area for temporarily holding image data obtained by a scanning process) of the program. However, the above-described image forming apparatus 1 according to an embodiment of the present invention is a so-called low-end model copier (low-cost copier), and therefore the memory installed as the work area for the program is smaller than that of a high-end model copier. The image forming apparatus 1 is not provided with a HDD (high-capacity secondary storage).

(Function)

Figure 2:
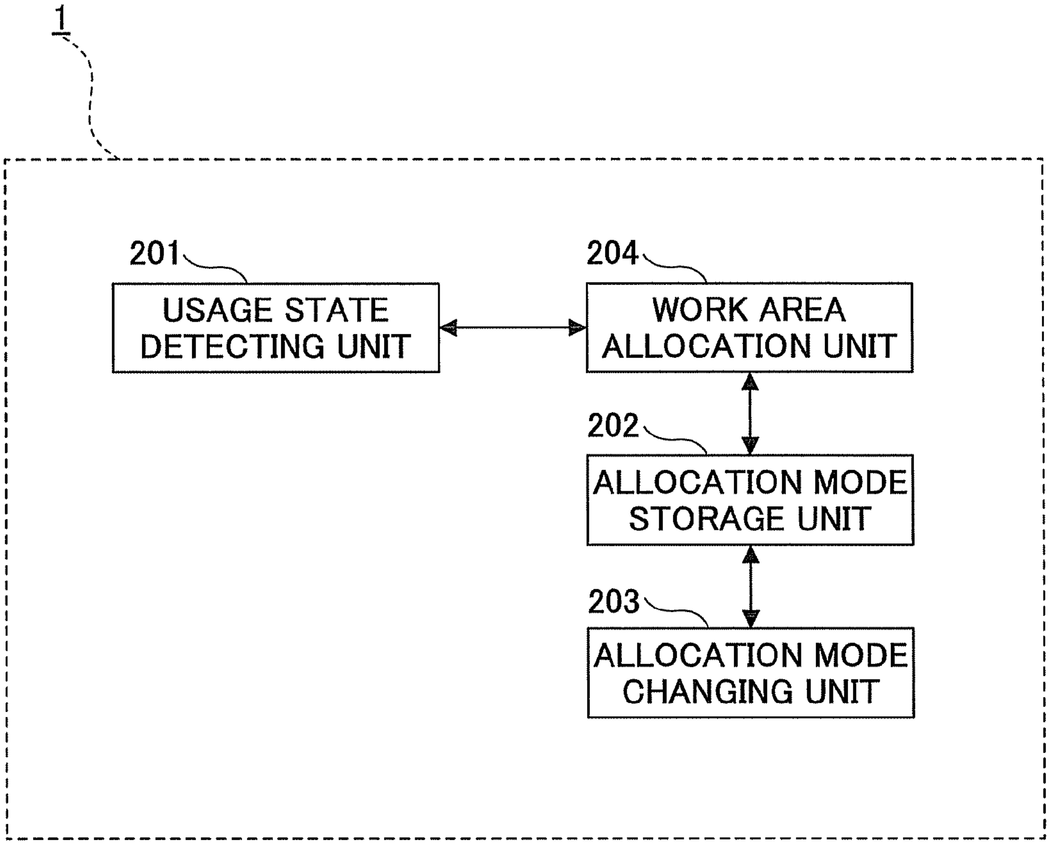
FIG. 2 is a functional block diagram of the main functions of the image forming apparatus according to an embodiment of the present invention.

FIG. 2 is a functional block diagram of the main functions of the image forming apparatus 1 according to an embodiment of the present invention. The main functions included in the image forming apparatus 1 are a usage state detecting unit 201, an allocation mode storage unit 202, an allocation mode changing unit 203, and a work area allocation unit 204.

The usage state detecting unit 201 detects the usage state (availability) of the storage area. The usage state detecting unit 201 has a function of detecting whether the real memory can be used, or detecting the availability in the real memory, based on the ON/OFF states of the bits in the management area provided in accordance with the storage area (real memory). More details are given below.

The allocation mode storage unit 202 has a function of storing allocation modes for defining the method of allocating the storage area to the program. The allocation modes are described below in more detail.

The allocation mode changing unit 203 has a function of changing the allocation mode that is stored in the allocation mode storage unit 202.

The work area allocation unit 204 has a function of (securing and) allocating a storage area to a program to be executed, as the work area of the program. This allocation is performed according to the usage state of the storage area detected by the usage state detecting unit 201, and the allocation mode stored in the allocation mode storage unit 202.

These functions are actually implemented by programs executed by the CPU 11C.

Embodiment

A description is given of storage area management performed by the image forming apparatus 1 according to the present embodiment. The image forming apparatus 1 detects the usage state of the storage area, and allocates, according to the set allocation mode, a storage area to an application program for implementing the basic function or an extension function pertaining to image formation. The storage area is a work area used by the application program to be executed by the CPU 11C. The storage area according to the present embodiment is, for example, a low-capacity RAM. The storage capacity of this storage area is not large enough for loading the application programs for implementing all basic functions and extension functions installed in the image forming apparatus 1. However, even when the storage area of the image forming apparatus 1 is a low-capacity memory, a storage area management method according to an embodiment of the present invention makes it possible to efficiently use the storage area for operating plural application programs. A detailed description is given below.

(Storage Area Management)

Figure 3:
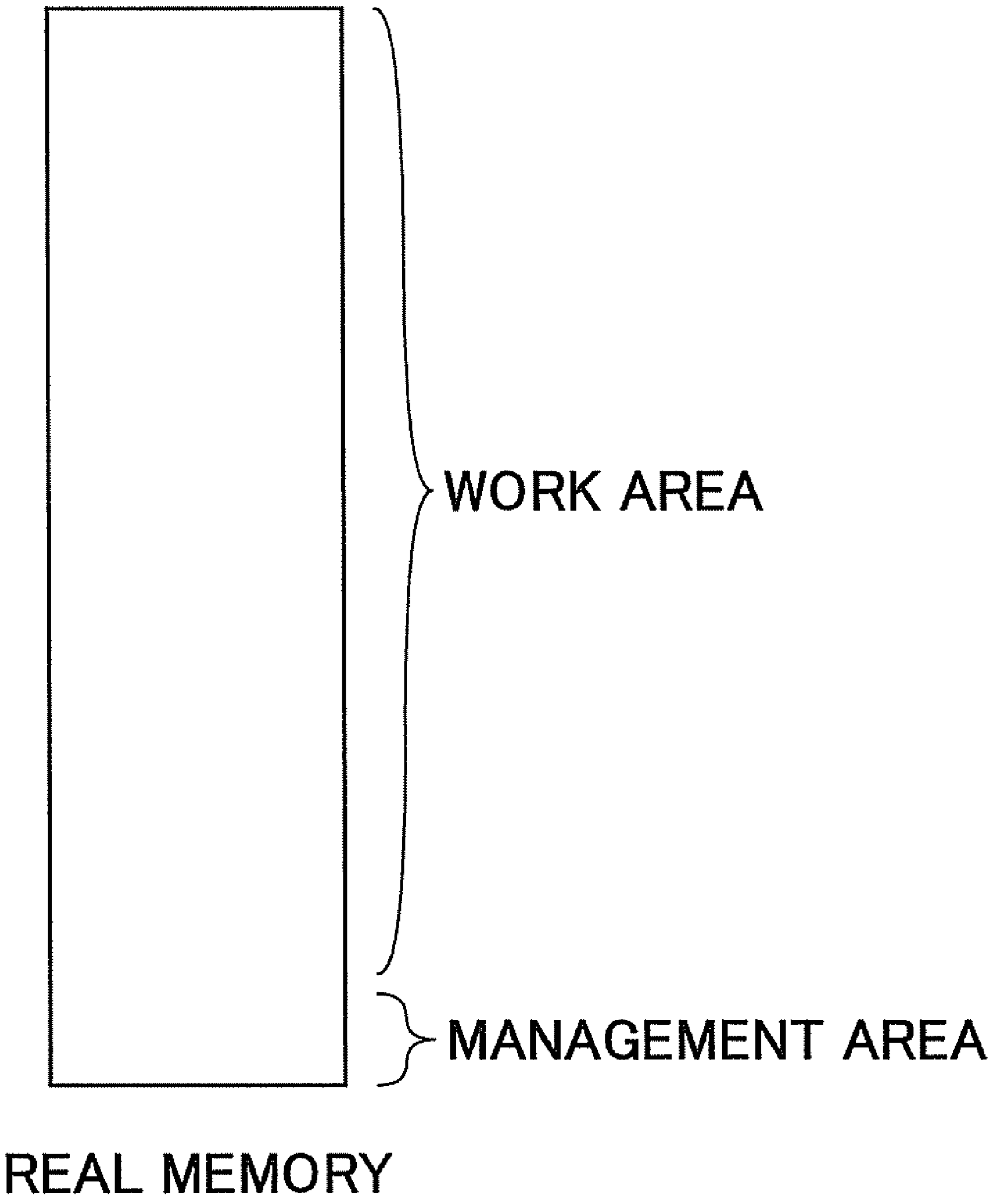
FIG. 3 illustrates a real memory serving as a work area according to the present embodiment.

FIG. 3 illustrates a real memory serving as the work area according to the present embodiment. For example, the real memory is the RAM 118 serving as a work area (an area for temporarily holding various information items such as image data) of an application program. The real memory is divided into a work area for the application program and a management area for storing management information used for detecting the usage state of the real memory. A predetermined area is secured in advance as the management area.

Figure 4:
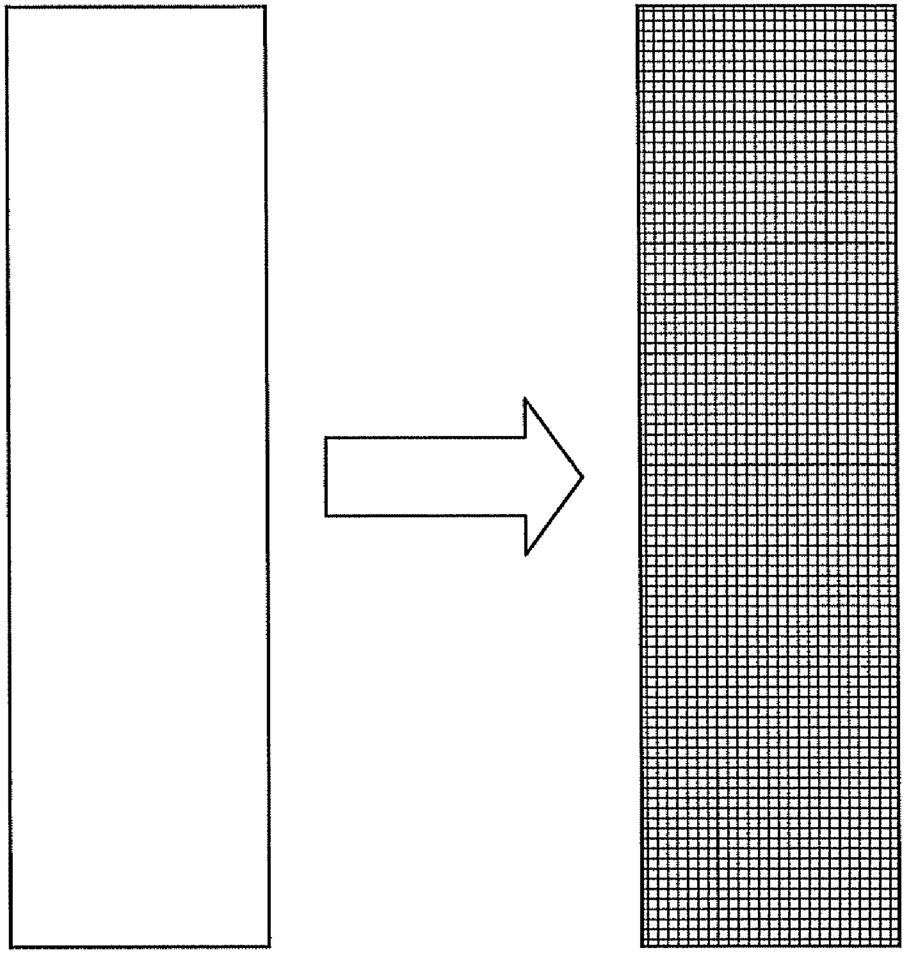
FIG. 4 illustrates the real memory being divided into block units.

Next, a storage area management method performed by the image forming apparatus 1 according to the present embodiment is described with the use of specific values. As shown in FIG. 4, the real memory is first divided into block units to perform storage area management. Assuming that the capacity of the area in the real memory is 256 MB (megabytes) and each block unit is 4 KB (kilobytes), the following equation is satisfied.

256 MB/4 KB=262,144 KB/4 KB=65,536 (1 MB=1,024 KB)

Thus, 65,536 blocks are formed. Then, an area (referred to as a management area) is formed in the real memory in units of blocks. The management area has the same number of bits as the number of the blocks, which are obtained by dividing the real memory. Each bit in the management area is expressed as being ON/OFF ("0" or "1"), to distinguish whether the corresponding block in the real memory is used/not used.

Accordingly, a management area capacity of 65,536 bits is secured, which corresponds to the number of blocks (65,536 blocks) obtained by dividing the real memory. The capacity of 65,536 bits can be converted into 8,192 bytes, which is approximately 8 KB. Accordingly, the real memory can be divided into a usage area and a non-usage area with the use of the management area (capacity) of 8 KB. As described above, the management area is an assembly of bits that correspond to blocks.

The size of each block (block size) is determined according to the installed real memory and the number of bits that can be managed. Assuming that the number of bits that can be managed is only 65,536 bits and the real memory is 512 MB, if the block size is 4 KB, the total number of blocks will be 131,072 blocks, which exceeds the number of bits that can be managed. In this case, the block size can be changed to, for example, 8 KB, so that the number of blocks corresponds to less than or equal to 65,536 bits. Furthermore, the block size also depends on the management area (capacity). For example, when the management area has a large capacity of 131,072 bits, even if the real memory is 512 MB, the management area can be divided into blocks of 4 KB. One block is equal to one bit, and therefore as the number of blocks increases, a larger management area (capacity) will be required. The management area (capacity) can be reduced by increasing the size of each block. Conversely, when the size of each block is reduced and the number of blocks is increased, a larger management area (capacity) will be required, but the usage/non-usage state of the real memory can be detected in terms of fine unit areas (with higher precision).

Figure 5:
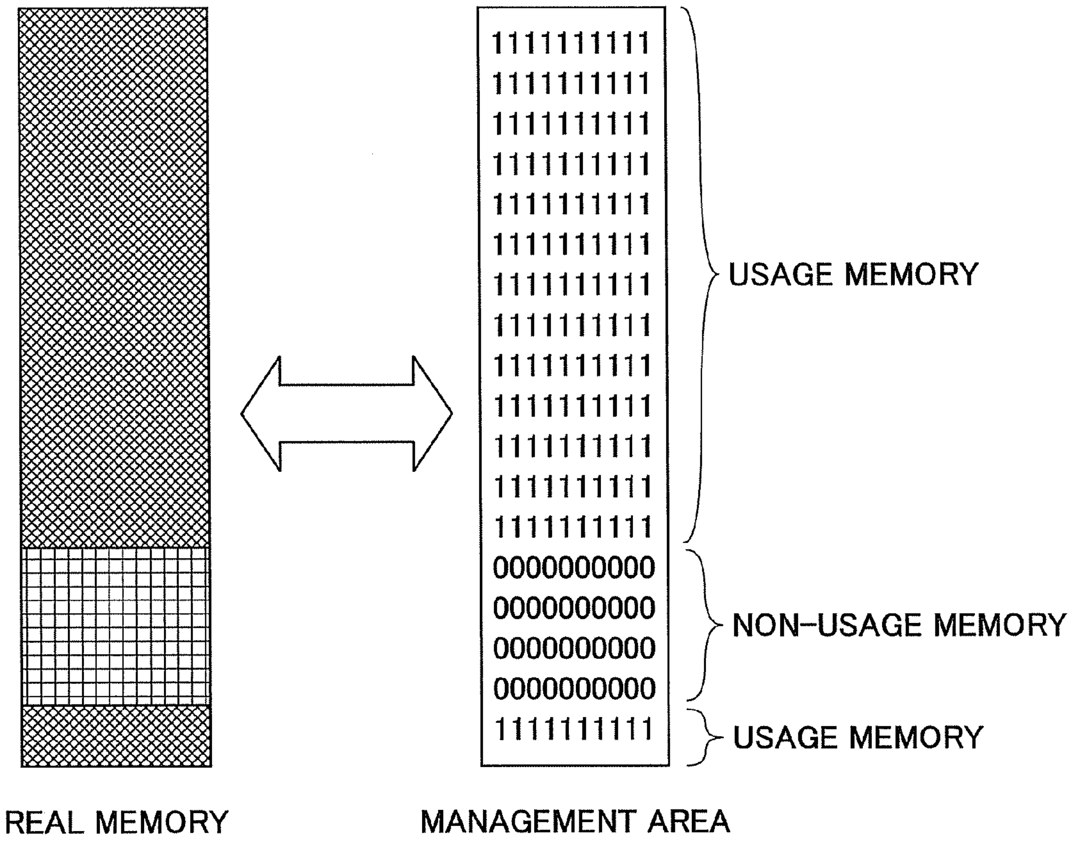
FIG. 5 schematically illustrates the real memory and the corresponding management area.

FIG. 5 schematically illustrates the real memory and the corresponding management area. The bits are ON (1) in the parts of the management area corresponding to the areas (blocks) that can be used in the real memory. That is, the bits are ON (1) in the parts of the usage memory of the management area. Such a management area can be used like a real memory management table to recognize the availability in the real memory. That is, the usage state detecting unit 201 can detect whether the real memory can be used, or detect the availability in the real memory, based on the ON/OFF states of the bits in the management area corresponding to the storage area (real memory).

(Allocation Nodes)

Next, a description is given of the allocation modes (management modes). An allocation mode is for defining how the work area allocation unit 204 is to allocate a work area to an application program. Examples of the allocation mode include a single mode, where a work area can only be allocated to one application program at a time; and a plural mode, where work areas can be allocated to plural application programs at a time. The work area allocation unit 204 allocates a work area to an application program to be executed, according to the set allocation mode. Information (flag) indicating the set allocation mode is held in the RON 11A which is a non-volatile memory, and the indicated allocation mode is applied. Details are given below.

Before describing the allocation modes, a description is given of the work area (capacity) required for an application program. The work area (capacity) required by an application program varies according to the level of the function to be implemented by the application program. The required work areas (standard area, specified maximum area, minimum area) according to three different function levels are described below.

"Standard Area"

Figure 6:
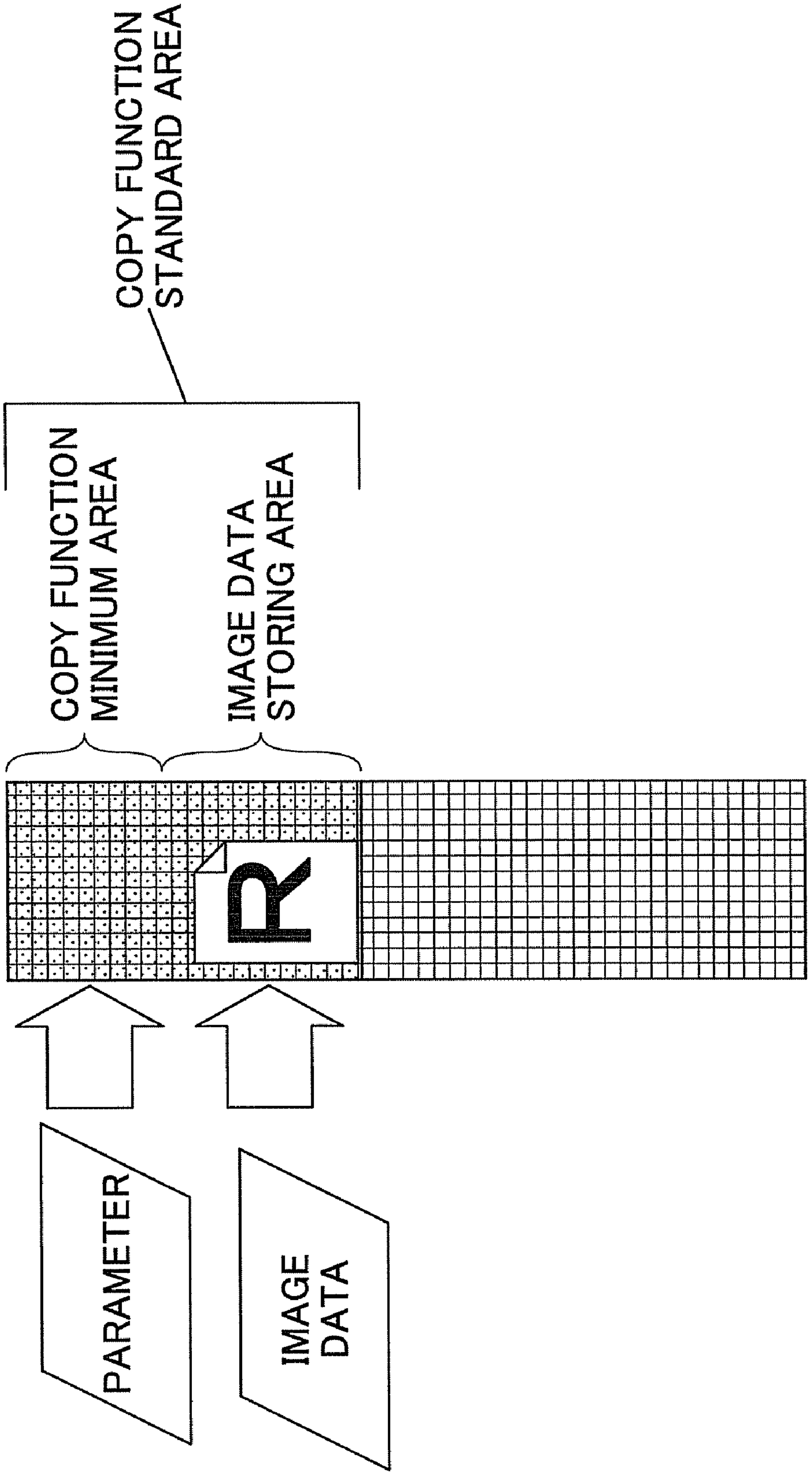
FIG. 6 illustrates a standard area.

A standard area is the work area (capacity) required for implementing the minimum function of an application. For example, as shown in FIG. 6, a standard area of a copy function is a work area (capacity) required for performing a minimum copying process (scan and print image). The standard area includes a minimum area for storing setting values (parameters) and an image data storing area for storing image data. Specifically, the standard area has a capacity for temporarily storing image data obtained by a scanning process, printing image data (bitmap image), and setting values (parameters). The standard area only needs to be large enough for performing the minimum function of the application. Therefore, the image data storing area to be secured in the standard area only needs to be large enough for storing image data corresponding to one sheet, even when the maximum number of image sheets that can be supported by the application is specified as 20 sheets.

The application for performing image processing in the image forming apparatus 1 uses image data. There is a large difference between the work area (capacity) required for executing the specified maximum function, and the work area (capacity) required for executing a limited function that can be performed within the standard area. For example, when the application is specified as being capable of supporting 20 image sheets at maximum, but the area capacity (standard area capacity) can only accommodate one sheet, the work area (capacity) can be reduced by an amount corresponding to 19 images. In this manner, the image forming apparatus 1 uses image data, and therefore significant effects can be achieved by limiting the standard area capacity as described above.

"Specified Maximum Area"

Figure 7:
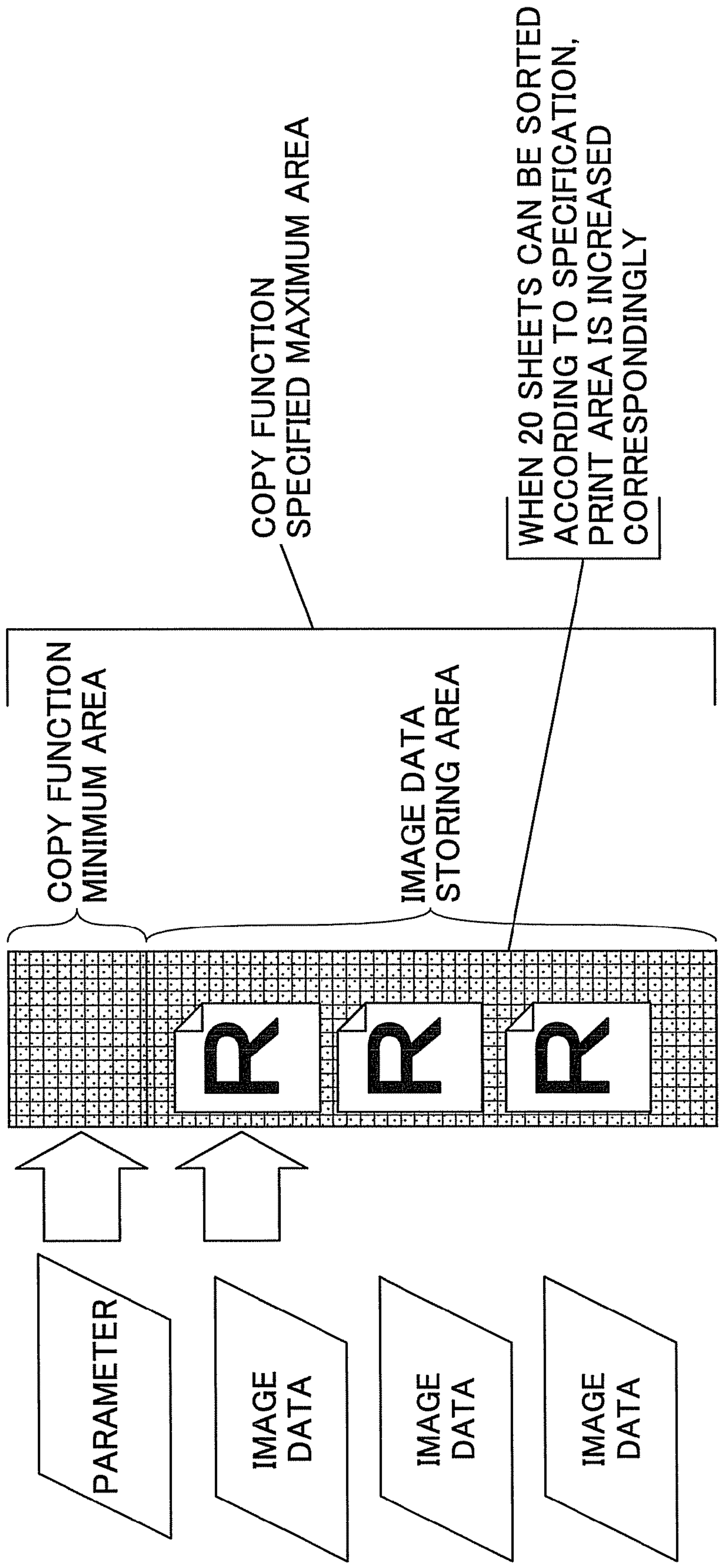
FIG. 7 illustrates a specified maximum area.

A specified maximum area is the work area (capacity) required for implementing the maximum function of an application. For example, as shown in FIG. 7, a specified maximum area of a copy function is a work area (capacity) required for performing a maximum copying process (scan and print image). The specified maximum area is the area required for implementing the maximum function specified for the application by the manufacturer. The specified maximum area includes a minimum area for storing setting values (parameters) and an image data storing area for storing image data. Specifically, the specified maximum area has a capacity for temporarily storing image data obtained by a scanning the specified maximum number of sheets, print image data (bitmap images), and setting values (parameters). In order to perform the specified maximum function, the image data storing area to be secured in the specified maximum area needs to have an area capacity for accommodating 20 sheets, assuming that 20 sheets is the specified maximum image sheets of the application. Accordingly, the image data storing area in the in the "specified maximum area" is larger than that of the "standard area".

"Minimum Area"

Figure 8:
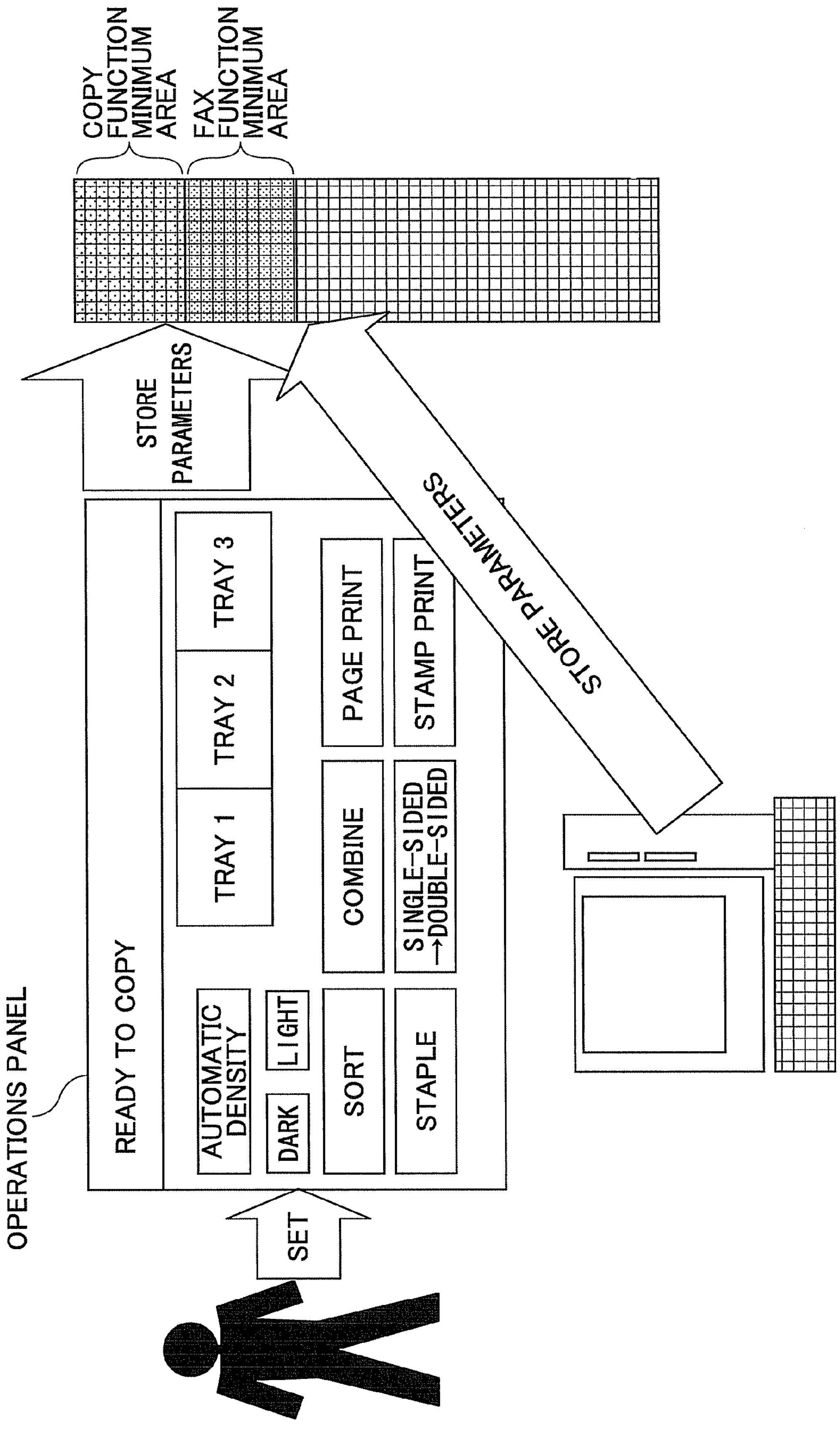
FIG. 8 illustrates a minimum area.

A minimum area is the work area (capacity) required for the application to be activated (to respond) at a minimum level. The minimum area is the work area (capacity) required for holding parameters such as setting values input by the user. For example, as shown in FIG. 8, a parameter pertaining to a print command is received from a user's terminal or an operations panel. This parameter is temporarily stored (buffered) in the minimum area. When a parameter pertaining to printing is sent from the user terminal to the image forming apparatus 1, unless the minimum area of the image forming apparatus 1 is prepared to receive and hold the parameter, the application cannot respond to the print command, and time out may occur. Thus, the application is activated at a minimum level and a predetermined work area (minimum area) is secured, so that the parameter from the user's terminal can be temporarily stored in the work area. Then, a reception standby notification is sent to the user's terminal. The image forming apparatus 1 waits until a work area corresponding to the standard area becomes available. When a work area for the print image data is secured, a notification indicating that print image data can be received is sent to the user's terminal. By making a minimum area constantly available for all of the applications, all of the applications will appear to be operating. However, each function cannot be actually executed until a work area greater than or equal to the standard area is secured. Thus, in the example shown in FIG. 8, the copy function and the fax function appear to be operating from the user's terminal; however, the copy function and the fax function can be actually operated when a work area greater than or equal to the standard area is secured. The "standard area" and the "specified maximum area" obviously include the "minimum area", as described above.

Next, a description is given of the allocation modes based on the above configurations. Examples of the allocation mode are a single mode, a plural mode, a combination mode, and an MA (minimum area) operation mode.

"Single Mode"

Figure 9:
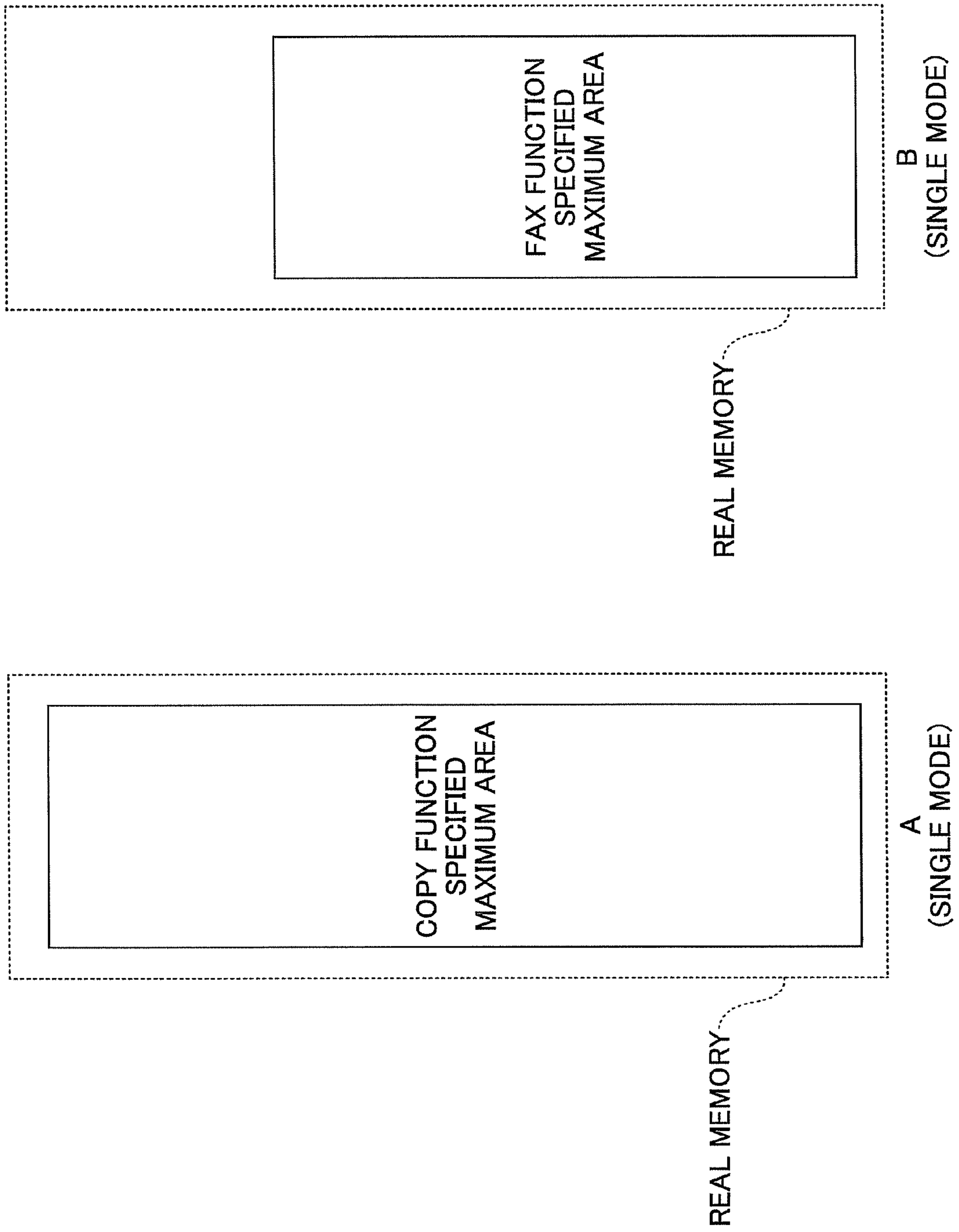
FIG. 9 is for describing a single mode.

A single mode is for dynamically allocating a work area to a single program to which the work area can be allocated. In the single mode, a single application can occupy the work area, and is therefore effective for executing an application that requires the specified maximum area. FIG. 9 is for describing the single mode. In "A" on the left side (copy function single mode), the copy function specified maximum area is allocated in the work area. In "B" on the right side (fax function single mode), the fax function specified maximum area is allocated in the work area. While the copy function is being performed, other applications cannot be performed because the work area is only allocated to a single application. In the single mode, when the copying process ends, a mode switching request is received (for switching from a copy function single mode to a fax function single mode), the work area is initialized, and then the fax function specified maximum area is dynamically allocated, so that the fax function can be performed.

"Plural Mode"

Figure 10:
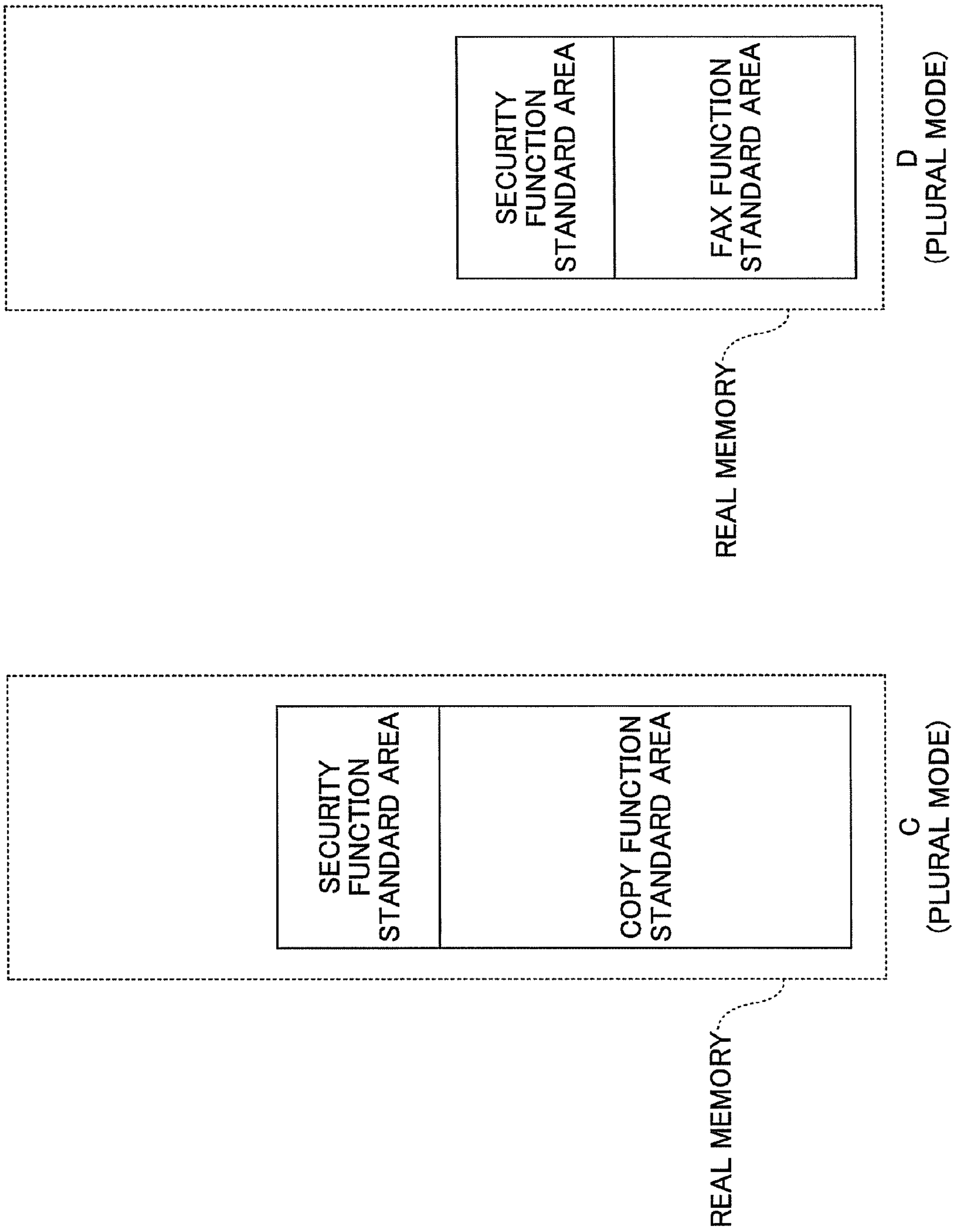
FIG. 10 is for describing a plural mode.

A plural mode is for dynamically allocating a work area to plural programs to which the work area can be allocated. When an application requiring a specified maximum area is executed, most of the work area is occupied, and therefore other applications need to wait until the work area becomes available. The plural mode is effective when the application does not require a work area for executing the specified maximum function, but only requires a work area for executing the minimum function, i.e., a standard area. That is, the plural mode is effective when only minimum functions need to be performed so that the work area can be shared by plural applications. FIG. 10 is for describing the plural mode. The work area for the copy function is limited to the standard area (capacity), instead of the specified maximum area. Accordingly, the remaining work area can be allocated to another application to which the work area can be allocated (for example, a security function standard area) (C: plural mode). The work area required for the fax function is limited to the standard area (capacity), instead of the specified maximum area. Accordingly, the remaining work area can be allocated to another application to which the work area can be allocated (for example, a security function standard area) (D: plural mode). The work area would be occupied by a single application if a specified maximum area was allocated. However, in the plural mode, the work area can be allocated to plural applications. Therefore, plural applications can be operated without waiting for the work area to become available.

"Combination Mode"

Figure 11:
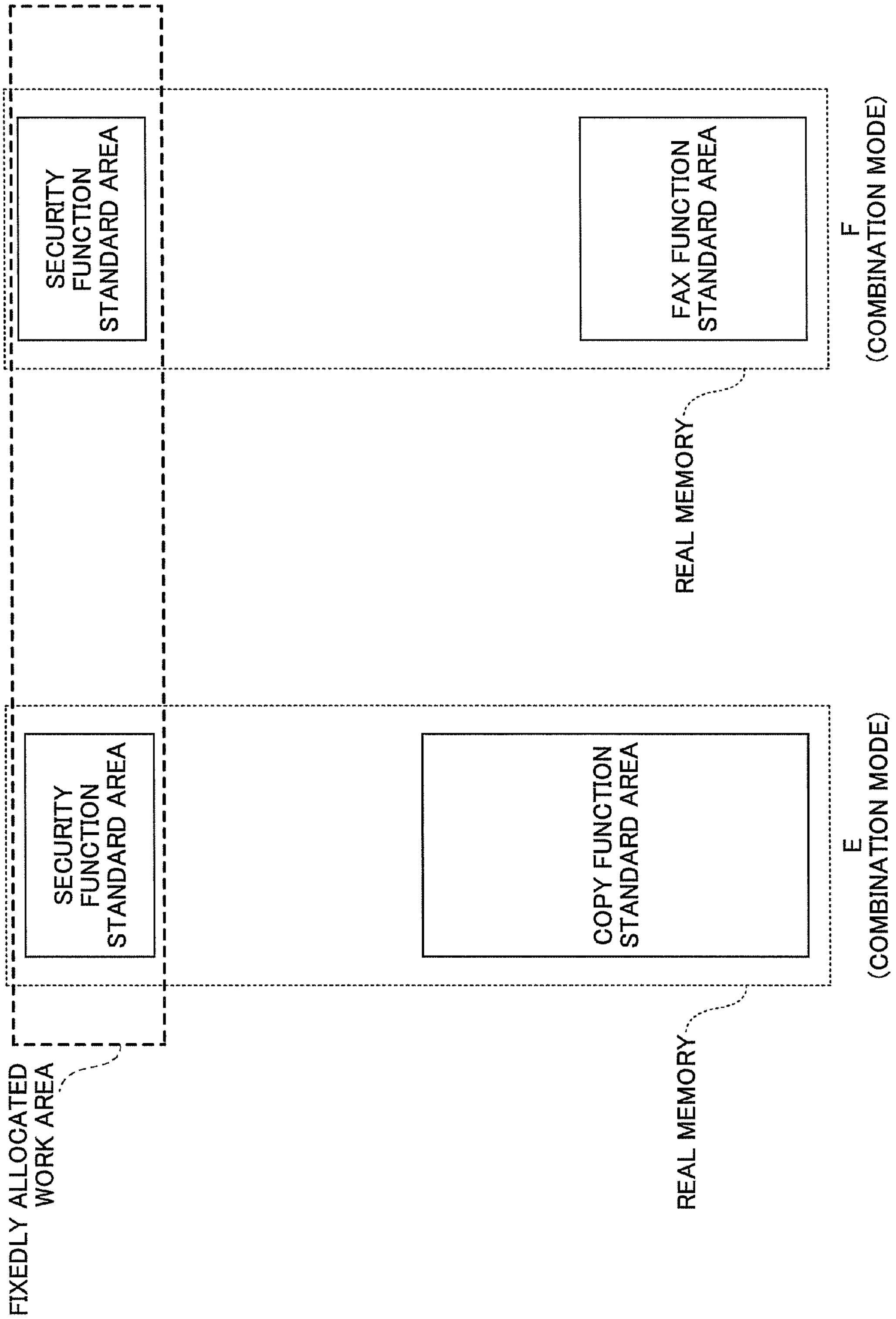
FIG. 11 is for describing a combination mode.

The combination mode is a mode for fixedly (on a rigid basis) allocating a part of the work area to a program to which the work area can be allocated, and dynamically allocating the remaining part of the work area to another program to which the work area can be allocated. In the combination mode, a certain area capacity of the work area is fixedly allocated to a particular application, and the remaining work area is dynamically allocated to another application. Therefore, the combination mode is effective when there is a particularly important function or a function that needs to be constantly and immediately used. FIG. 11 is for describing the combination mode. A security function standard area is fixedly allocated so that the minimum security function can be constantly used, which is suitable for a user who places importance on security (E, F: combination mode). The plural mode or the MA operation mode can be applied to parts of the work area other than the fixedly allocated part, depending on the available work area capacity.

"MA Operation Mode"

Figure 12:
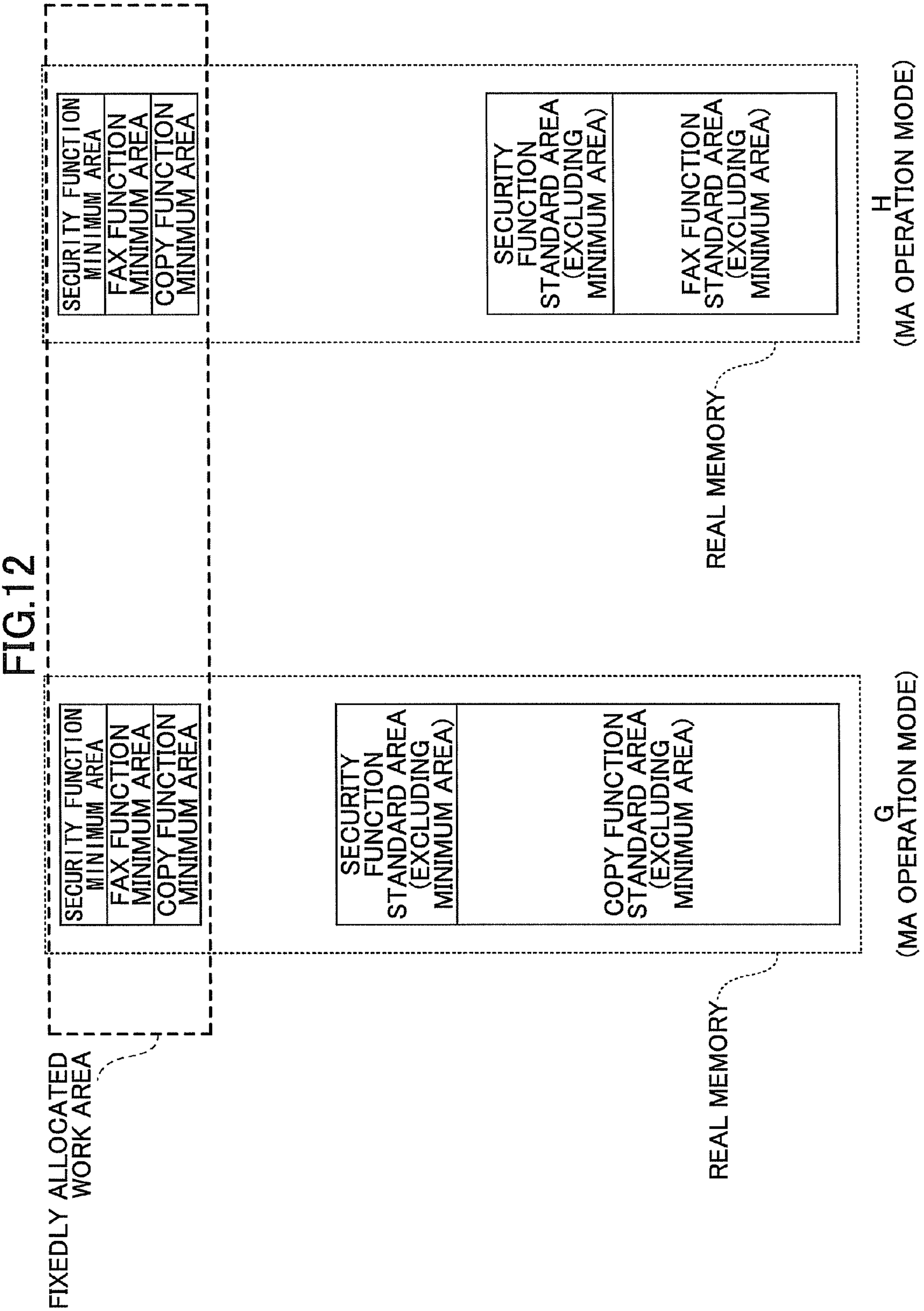
FIG. 12 is for describing an MA (minimum area) operation mode.

The MA operation mode is for fixedly allocating a part of the work area to the minimum requisite program for responding to a program execution request. The MA operation mode is for fixedly securing a work area (minimum area) used only for storing parameters, in preparation for responding to a request from a user's terminal, as described above. FIG. 12 is for describing the MA operation mode. In this example, a copy function minimum area, a fax function minimum area, and a security function minimum area are fixedly secured in the work area, and therefore these functions appear to be constantly operating as viewed from the user (G, H: MA operation mode). However, each function cannot be actually operated until a work area greater than or equal to the standard area is secured. In the MA operation mode, the user has constant access to multiple functions because the corresponding applications can be executed any time.

(Setting Allocation Mode)

Figure 13:
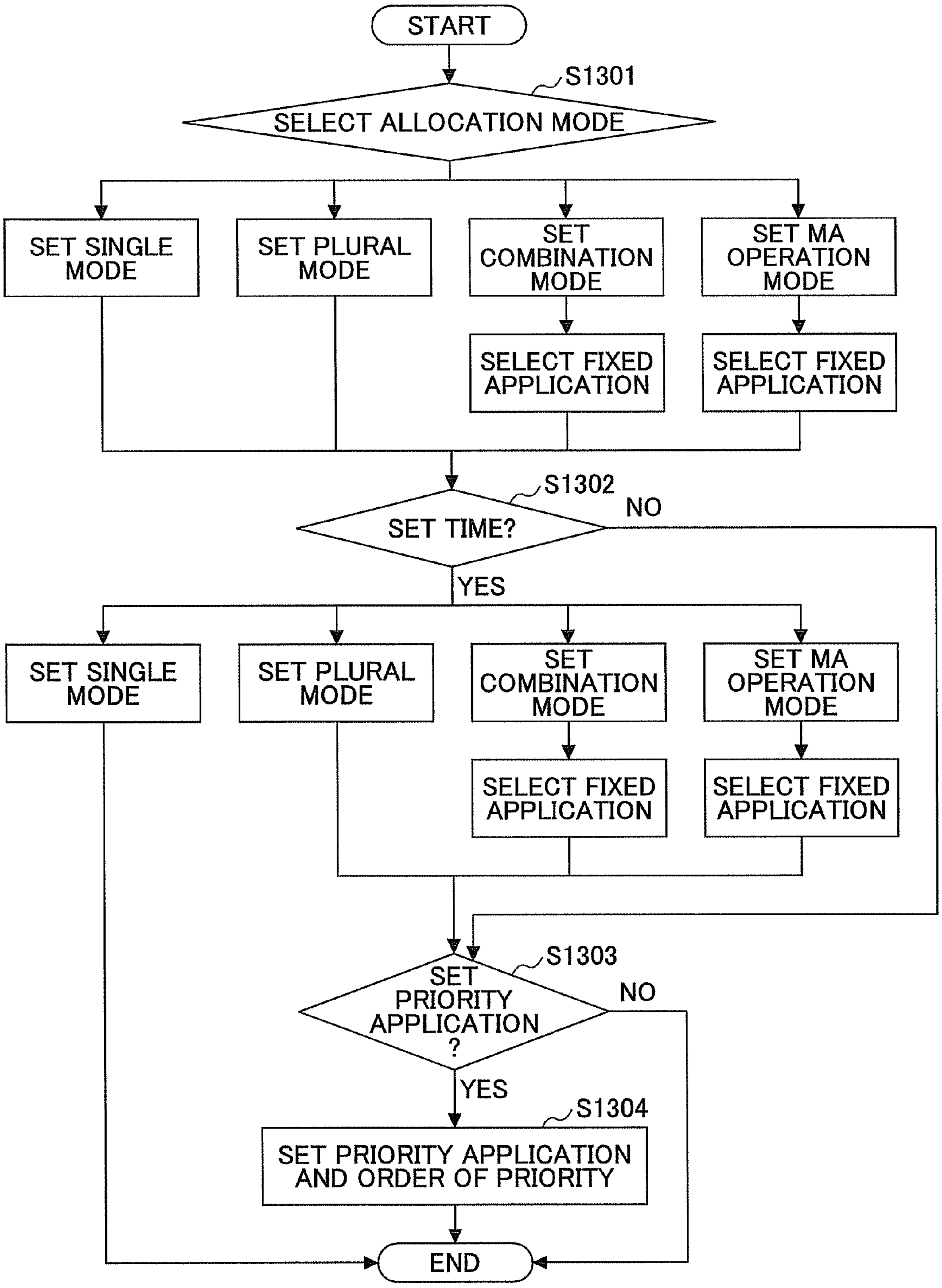
FIG. 13 is a flowchart of an allocation mode setting operation.

Next, a description is given on the operation of setting an allocation mode. As described above, an allocation mode defines how a work area is to be allocated to an application program. The allocation mode is set in advance by the user. FIG. 13 is a flowchart of an allocation mode setting operation.

In step S1301, a user selects an allocation mode. In this example, one allocation mode is selected from among a single mode, a plural mode, a combination mode, and an MA operation mode. When the user selects the combination mode, the user also selects the application program to which a part of the work area is to be fixedly allocated. When the user selects the MA operation mode, the user also selects the minimum requisite application program for responding to a program execution request, so that a part of the work area is fixedly allocated to the corresponding minimum requisite application program.

In step S1302, the user sets a time. A time is set if the user wishes to change the allocation mode at a predetermined time. For example, during the daytime, the fax function is frequently used, and therefore the user may wish to fixedly allocate the work area to a fax function in a combination mode. Meanwhile, during the nighttime, the fax function is not used, and therefore the user may wish to allocate the work area to another application. In this manner, the option of setting a time is effective when the user wishes to change the application being used according to the time. When the user has set a time, the user subsequently sets the allocation mode to be applied after the set time. When the user does not wish to set a time, the procedure of setting the allocation mode is finished.

In step S1303, the user sets a priority application. This option can be made when the allocation mode set at step S1301 or step S1302 is the plural mode, the combination mode, or the MA operation mode. In the plural mode, the combination mode, or the MA operation mode, the work area can be dynamically allocated to plural application programs (except for applications corresponding to the fixed work area). By setting a priority application, the priority application is given priority over the other applications. Specifically, when the work area is allocated to plural applications, the priority application is given a larger part of the work area than the other applications. Because the priority application is given a larger work area, the corresponding function can be enhanced. When a priority application is to be set, the process proceeds to step S1304, where the user specifies the priority application and the order of priority. Then, the operation of setting an allocation mode ends.

The above-described operation of setting an allocation mode is performed by the function of the allocation mode changing unit 203.

(Securing Allocation Mode)

Figure 14:
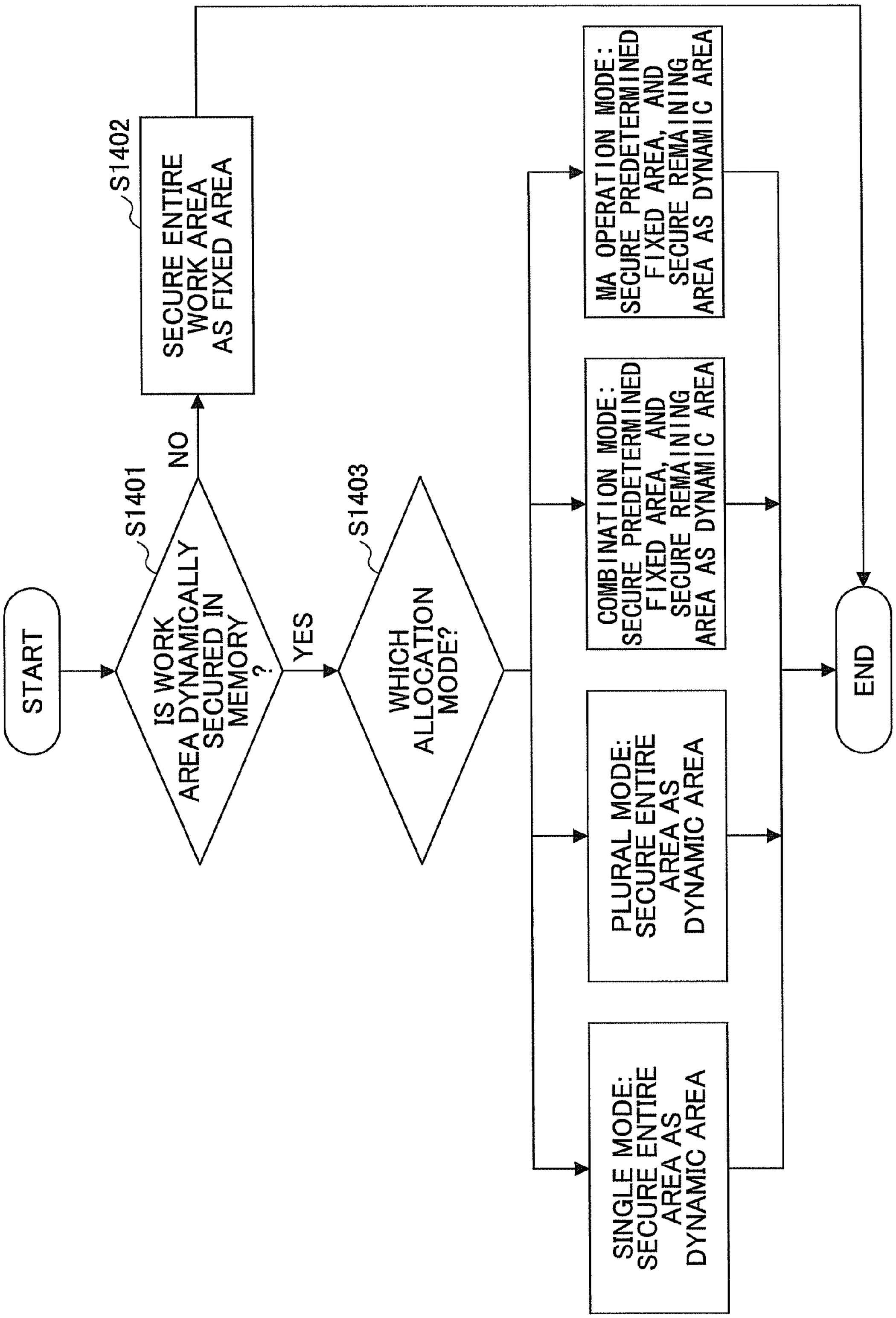
FIG. 14 is a flowchart of an operation of securing (allocating) a storage area when the image forming apparatus is activated.

Next, a description is given of an operation of securing (allocating) a storage area of the image forming apparatus 1 when the power is turned on. FIG. 14 is a flowchart of an operation of securing (allocating) a storage area when the image forming apparatus 1 is activated.

In step S1401, when the work area is to be dynamically secured, the process proceeds to step S1403. When the work area is not to be dynamically secured, the process proceeds to step S1402.

In step S1402, the entire work area is fixedly secured in the required memory.

In step S1403, the work area allocation unit 204 secures a work area to be allocated to a program according to the allocation mode. Information (flag) indicating the set allocation mode is held in the ROM 11A which is a non-volatile memory, and reference is made to the information (flag) of the allocation mode. As described above, the work area allocation unit 204 secures and allocates a storage area as a work area to a program to be executed, according to the usage state of the storage area detected by the usage state detecting unit 201, and the allocation mode stored in the allocation mode storage unit 202. In this case, the image forming apparatus 1 has just been activated (power has just been turned on), and therefore the usage state detecting unit 201 does not need to detect the usage state (availability) in the storage area because the storage area is obviously available. Even if the usage state is detected, the detection results will obviously indicate that the storage area is available.

As the work area is secured, the usage state detecting unit 201 changes the states of the bits in the management area corresponding to the secured storage area (real memory) to ON.

(Operation of Application)

Figure 15:
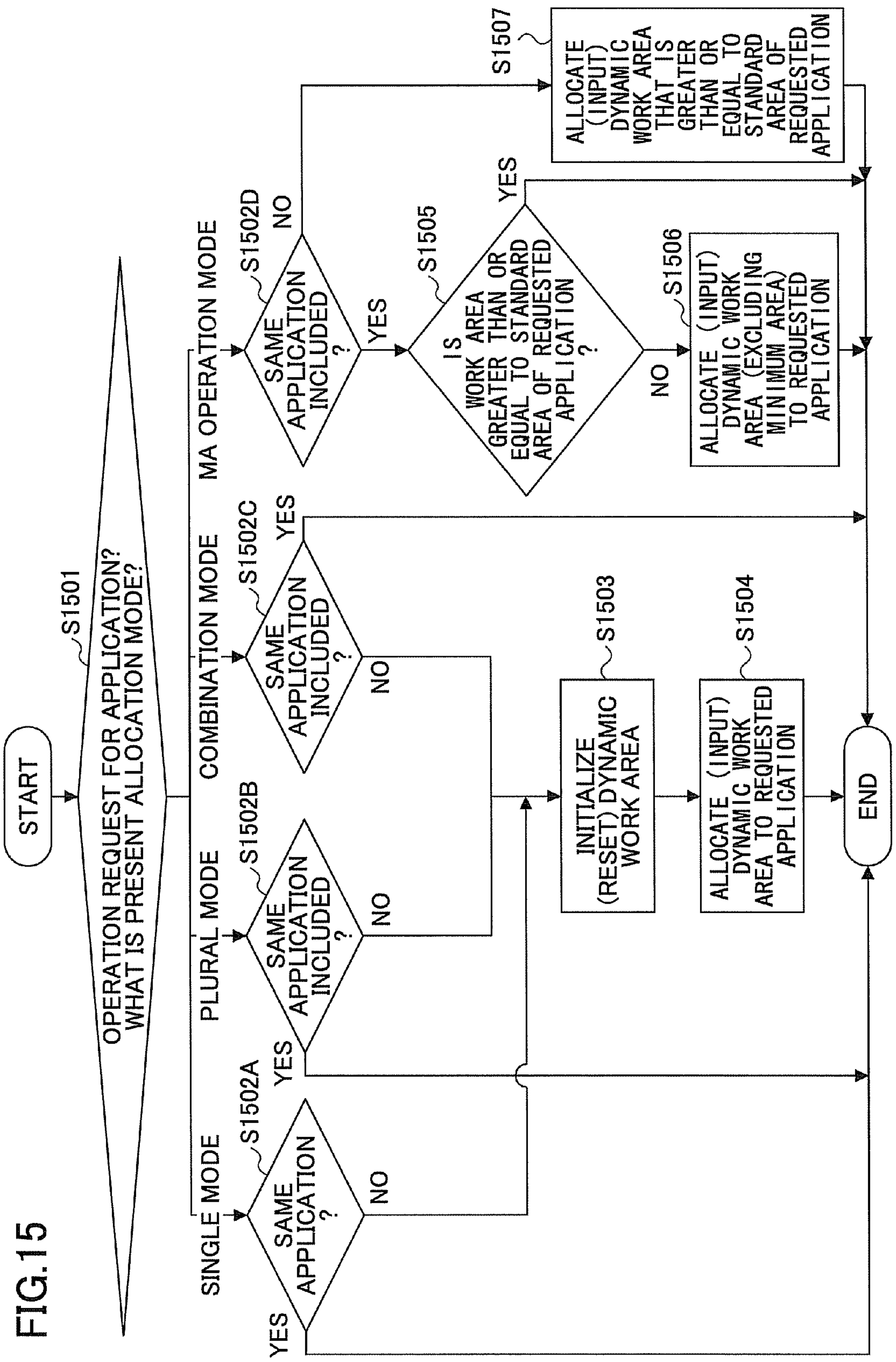
FIG. 15 is a flowchart of an operation when an application operation request is made.
Figure 16:
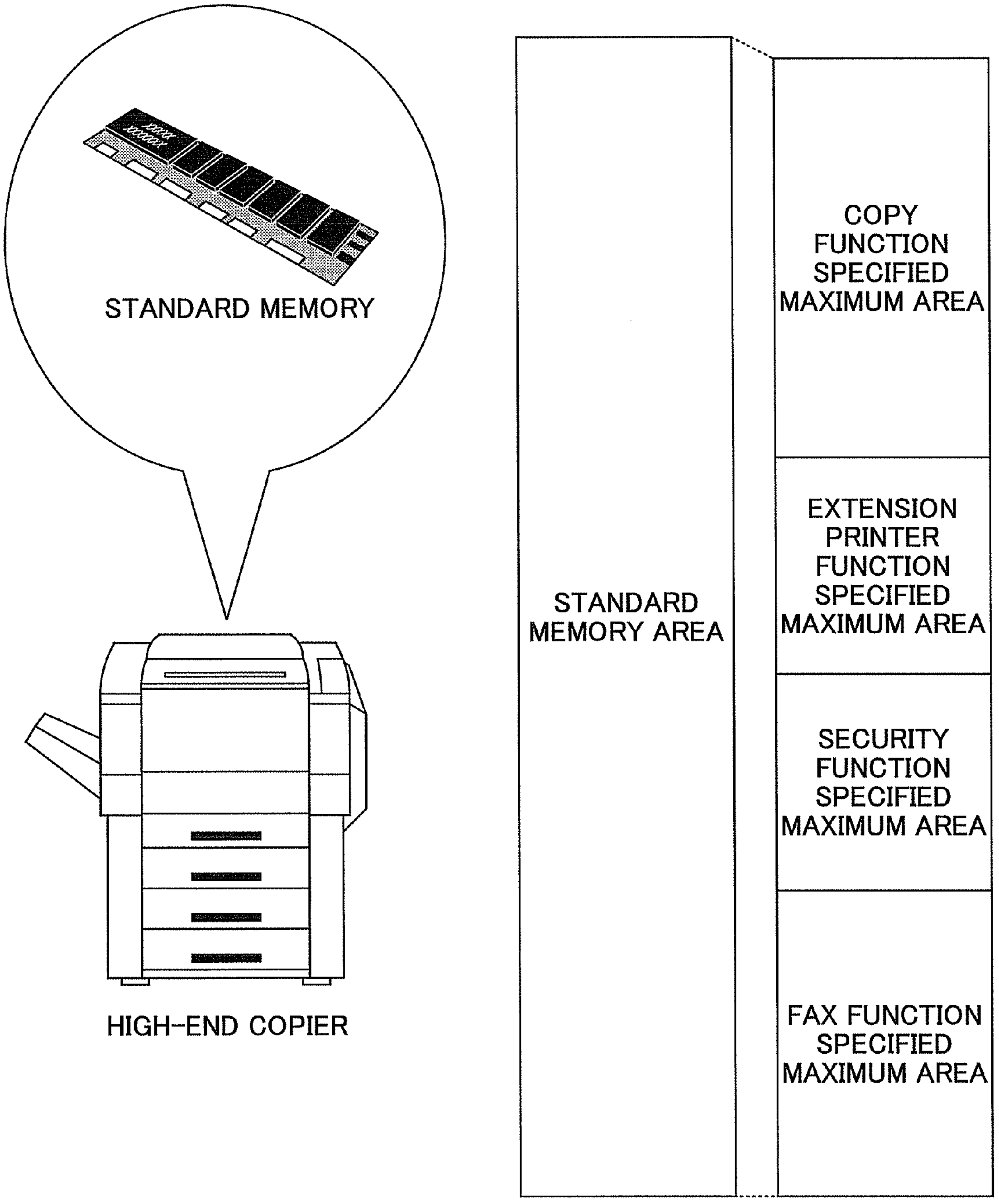
FIG. 16 schematically illustrates a standard memory area provided in a high-end model copier, and memory areas allocated to the installed applications.
Figure 17:
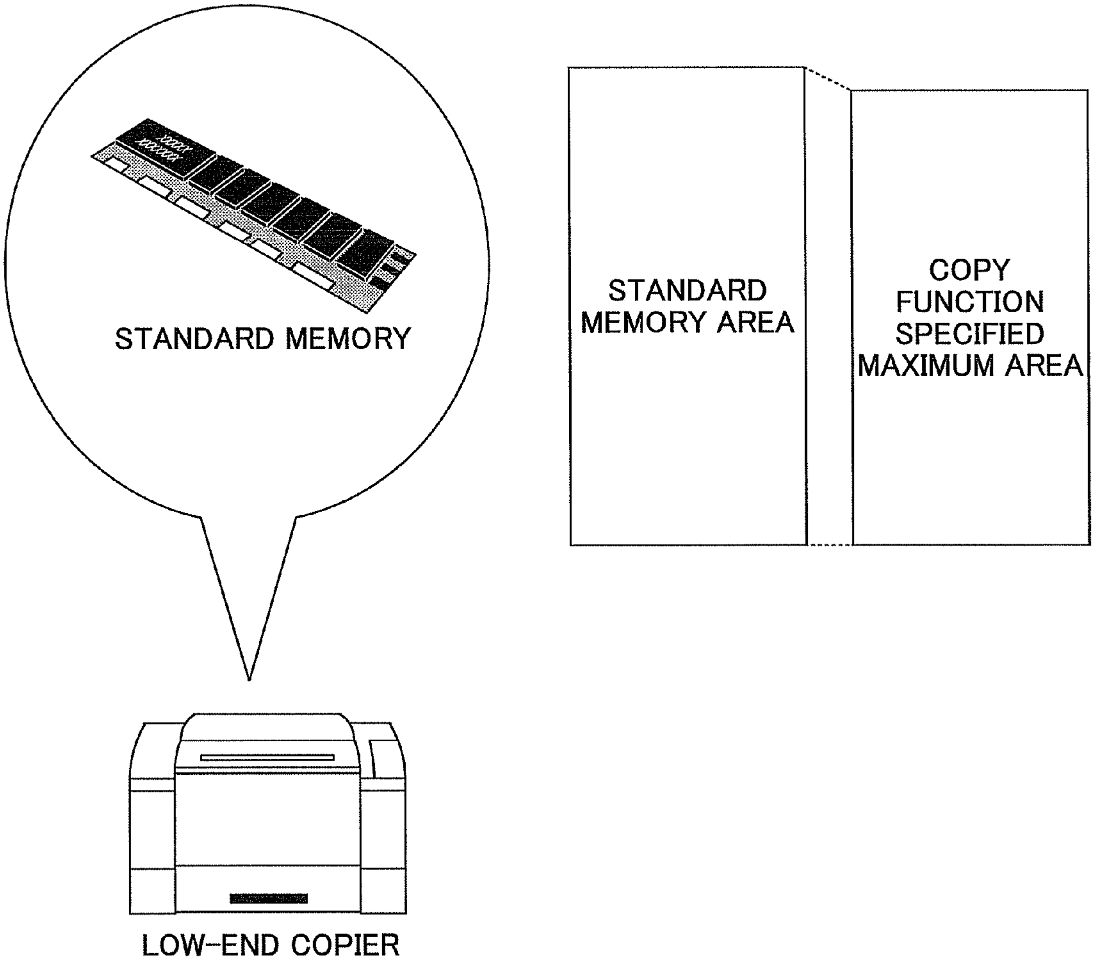
FIG. 17 schematically illustrates a standard memory area provided in a low-end model copier, and the memory area allocated to the installed application.
Figure 18:
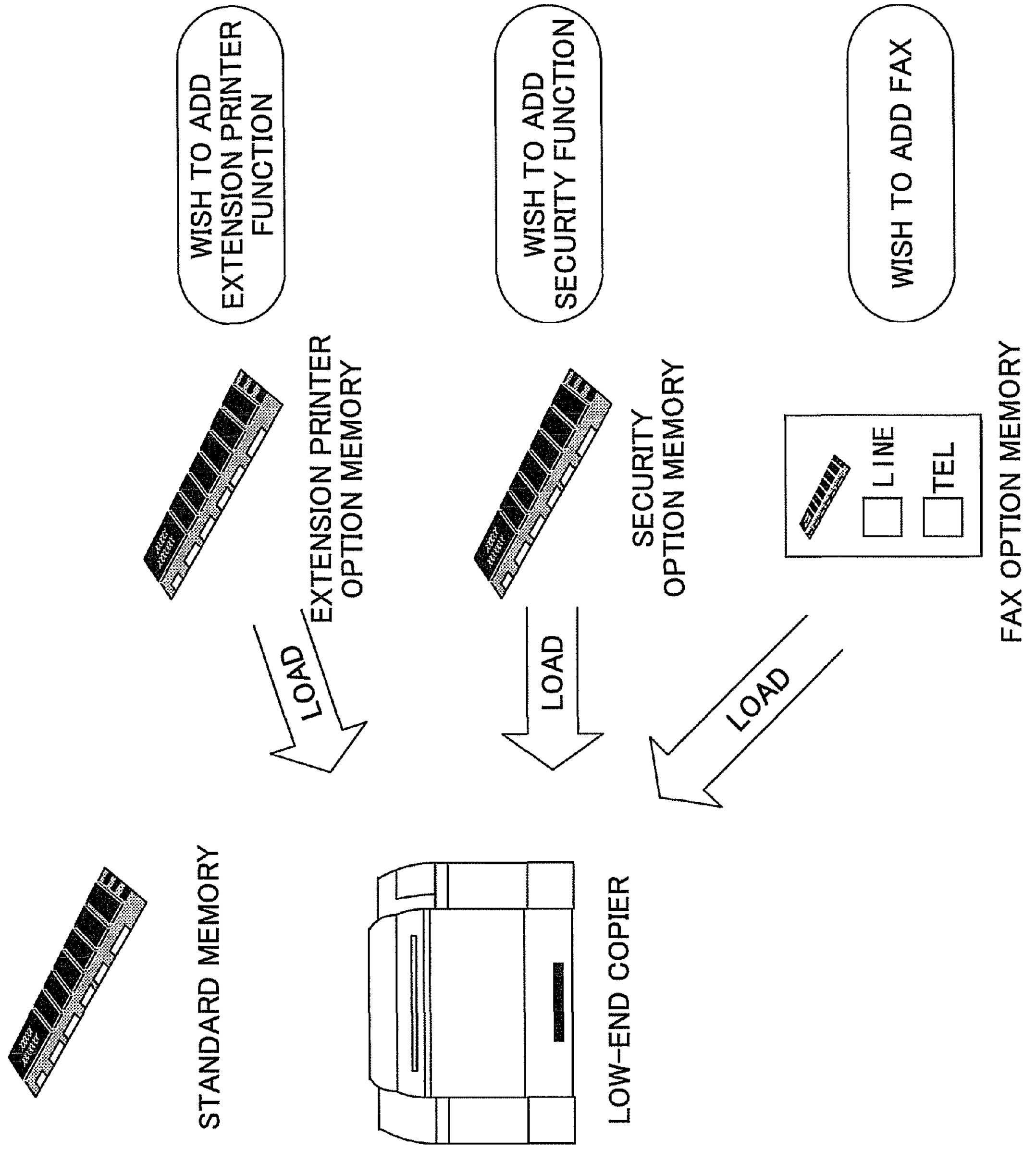
FIG. 18 schematically illustrates optional memories added to a low-end model copier.
Figure 19:
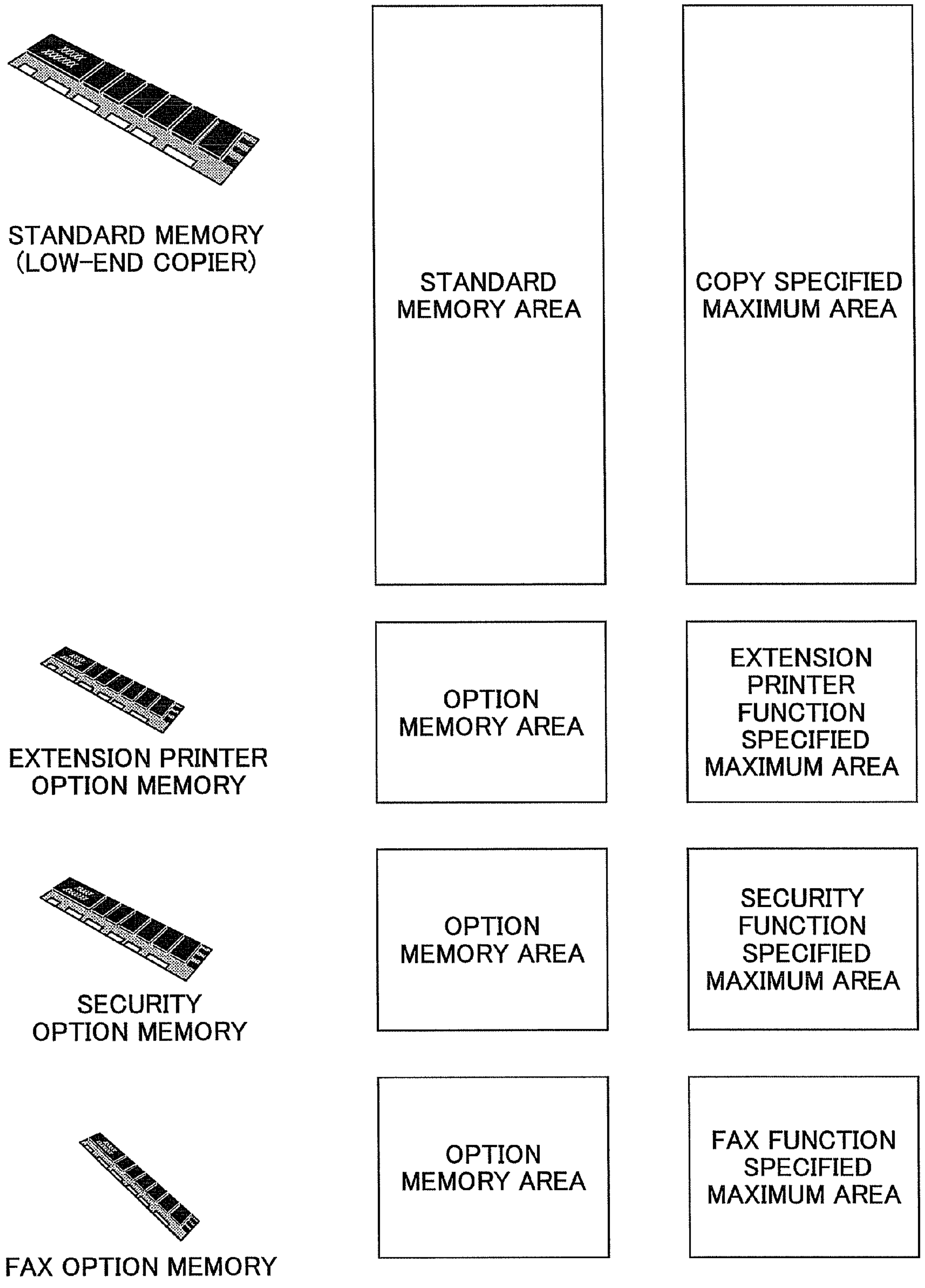
FIG. 19 schematically illustrates optional memories added to the low-end model copier, and memory areas allocated to the applications corresponding to the optional memory areas.

Next, a description is given of an operation performed when an application operation request is made. The work area allocation unit 204 allocates a work area to an application for which an operation request has been made (requested application). The function of this application program may be limited in accordance with the work area (capacity). Considering the memory capacity of a low-end model copier, when a specified maximum area can be secured in the remaining work area (capacity), a work area for implementing a function requiring the specified maximum area is secured. Conversely, when a specified maximum area cannot be secured in the remaining work area (capacity), a work area corresponding to a standard area is secured, and the function of the application program is limited (compared to the specified maximum function). A description of such an operation is given below with reference to FIG. 15.

In step S1501, when an operation request for an application is made, reference is made to the allocation mode storage unit 202 to determine the present allocation mode.

In a single mode, when the requested application is the same as the application for which a work area has already been allocated (application having an allocated work area) (YES in step S1502A), the application can be immediately operated, and therefore the operation is executed. When the requested application is not the same as the application already having an allocated work area (NO in step S1502A), a work area needs to be allocated to the requested application program. Accordingly, the process proceeds to step S1503, where the dynamic work area is initialized. Then, in step S1504, the work area allocation unit 204 allocates a work area to the requested application.

In the plural mode, when the requested application is the same as any of the applications for which work areas have already been allocated (YES in step S15028), the application can be immediately operated, and therefore the operation is executed. When the requested application is not the same as any of the applications already having an allocated work area (NO in step S1502B), a work area needs to be allocated to the requested application program. Accordingly, the process proceeds to step S1503, where the dynamic work area is initialized. Then, in step S1504, the work area allocation unit 204 allocates a work area to the requested application.

In the combination mode, when the requested application is the same as the application already having an allocated work area (including the fixed work area) (YES in step S1502C), the application can be immediately operated, and therefore the operation is executed. When the requested application is not the same as the application already having an allocated work area (NO in step S1502C), a work area needs to be allocated to the requested application program. Accordingly, the process proceeds to step S1503, where the dynamic work area is initialized. Then, in step S1504, the work area allocation unit 204 allocates a work area to the requested application.

In the MA operation mode, when it is determined that a minimum area has already been secured for the same application as the requested application (YES in step S1502D), and when a work area that is greater than or equal to the standard area of the requested application is secured in step S1505, the application can be immediately operated, and therefore the operation is executed. When a work area that is greater than or equal to the standard area of the requested application is not secured in step S1505, in step S1506, the work area allocation unit 204 allocates (inputs) a dynamic work area that is greater than or equal to the standard area of the requested application. When it is determined that a minimum area has not been secured for the same application as the requested application (NO in step S1502D), the process proceeds to step S1507, where the work area allocation unit 204 allocates (inputs) a dynamic work area that is greater than or equal to the standard area of the requested application.

The above description of the flowchart does not include cases where the work area cannot be allocated. Particularly, in the combination mode or the MA operation mode, a part of the work area is fixedly allocated, and therefore the capacity of the work area that can be dynamically allocated is small. Accordingly, there may be cases where the work area cannot be allocated when the usage state detecting unit 201 detects the usage state (availability) of a work area, and the work area allocation unit 204 attempts to allocate, based on the detection results, a dynamic work area that is greater than or equal to the standard area of the requested application. In such a case, the allocation mode is changed to, for example, a single mode (or a plural mode), in order secure a work area that is greater than or equal to the standard area of the application.

<Overview>

According to an embodiment of the present invention, the image forming apparatus 1 (low-end model copier) has a small memory capacity that can only accommodate the minimum requisite work area, but can efficiently use the work area to operate plural applications. Therefore, when adding an extension function to a low-end model copier, it is only necessary to acquire the application program for implementing the extension function, and there is no need to purchase an expensive physical memory. Accordingly, the user can enjoy the benefit of low cost of the low-end model copier.

An embodiment of the present invention provides an image forming apparatus, a memory management method, and a memory management program product, with which a low-capacity memory can be efficiently used to operate plural applications.

The present invention is not limited to the specifically disclosed embodiment, and variations and modifications may be made without departing from the scope of the present invention. For example, the present invention is not limited to a low-end model copier provided with a low-capacity memory for the purpose of cost reduction; the present invention is also applicable to an apparatus that is only provided with the minimum requisite physical memory (RAM) capacity at the time of shipment because the apparatus is shipped with only a single function (single application). For example, the image forming apparatus 1 may not only be a low-end model copier, but may also be a wide-width machine, which is a printer capable of performing printing on long strips. A wide-width machine is only provided with the minimum requisite physical memory capacity at the time of shipment. In this case, the memory capacity is not minimized for the purpose of cost reduction as in the case of a low-end model copier, but the memory capacity is minimized because the wide-width machine only has a single function. To print an image on an A0 size sheet under the conditions of 600 dpi and 8 bits (K—black), a RAM of approximately 520 MB is required. For color printing (CMYK—cyan, magenta, yellow, and black), four times as much memory capacity is required, i.e., approximately 2 GB. Even when the wide-width machine is shipped with a physical memory capacity of 4 GB (maximum physical capacity), when an extension application is added, the extension application may not be able to operate (due to memory shortage) unless the single mode is switched to another mode. The wide-width machine may be provided with a HDD to accommodate an extension application. However, by applying the present invention instead of buffering data in a HDD, the processing speed can be increased to execute the application in a favorable manner.

The present application is based on Japanese Priority Patent Application No. 2008-202156, filed on Aug. 5, 2008, the entire contents of which are hereby incorporated herein by reference.

What is claimed is:

1. An image forming apparatus comprising:

a storage area used as a work area of programs for implementing functions, the programs including a basic function program configured to implement a basic function and an extension function program configured to implement an extension function, wherein the entire storage area is used in the event that the basic function program is executed to implement a specified maximum function of the basic function;

a usage state detecting unit configured to detect a usage state of the storage area;

an allocation mode storage unit configured to store information indicating an allocation mode defining a method of allocating the work area to the programs; and a work area allocation unit configured to allocate the work area to each of the programs that is to be executed, according to the usage state of the storage area detected by the usage state detecting unit and the allocation mode stored in the allocation mode storage unit.

2. The image forming apparatus according to claim 1, wherein the allocation mode is chosen from a group of allocation modes consisting of:

a single mode in which the work area is dynamically allocated to a single one of the programs to which the work area can be allocated;

a plural mode in which the work area is dynamically allocated to a plurality of the programs to which the work area can be allocated;

a combination mode in which a part of the work area is fixedly allocated to one of the programs to which the work area can be allocated and a remaining part of the work area is dynamically allocated to another one of the programs to which the work area can be allocated; and an MA operation mode in which a part of the work area is fixedly allocated to a minimum requisite program required for responding to a request to execute one of the programs.

3. The image forming apparatus according to claim 2, wherein:

in the event that the work area is allocated to each of the programs according to the plural mode, the combination mode, or the MA operation mode, the implemented function is limited compared to a specified maximum function of the corresponding program.

4. The image forming apparatus according to claim 2, wherein:

when the work area allocation unit dynamically allocates the work area to a plurality of the programs according to the plural mode, the combination mode, or the MA operation mode, the work area allocation unit allocates a larger part of the work area to a high-priority program included in the programs than to the programs other than the high-priority program.

5. The image forming apparatus according to claim 2, further comprising:

an allocation mode changing unit configured to change the allocation mode stored in the allocation mode storage unit, to a different allocation mode among the single mode, the plural mode, the combination mode, and the MA operation mode.

6. The image forming apparatus according to claim 5, wherein:

the allocation mode changing unit changes the allocation mode stored in the allocation mode storage unit according to time.

7. A memory management method performed by an image forming apparatus comprising a storage area used as a work area of programs for implementing functions, the programs including a basic function program configured to implement a basic function and an extension function program configured to implement an extension function, wherein the entire storage area is used in the event that the basic function program is executed to implement a specified maximum function of the basic function, wherein the memory management method comprises:

a usage state detecting step of detecting a usage state of the storage area;

an allocation mode storage step of storing information indicating an allocation mode defining a method of allocating the work area to the programs; and a work area allocation step of allocating the work area to each of the programs that is to be executed, according to the usage state of the storage area detected at the usage state detecting step and the allocation mode stored at the allocation mode storage step.

8. A memory management program product comprising instructions for causing a computer to perform the steps of the memory management method according to claim 7.

* * * * *